(12) United States Patent
Barua et al.

(10) Patent No.: US 11,314,231 B2
(45) Date of Patent: Apr. 26, 2022

(54) OPTIMIZING SUPPORT STRUCTURES FOR ADDITIVE MANUFACTURING

(71) Applicant: General Electric Company, Schenectady, NY (US)

(72) Inventors: Ananda Barua, Schenectady, NY (US); Sathyanarayanan Raghavan, Niskayuna, NY (US); Arun Karthi Subramaniyan, Niskayuna, NY (US); Changjie Sun, Schenectady, NY (US); Arvind Rangarajan, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/702,040

(22) Filed: Sep. 12, 2017

(65) Prior Publication Data

US 2019/0079491 A1    Mar. 14, 2019

(51) Int. Cl.
*B33Y 50/02* (2015.01)
*B29C 64/40* (2017.01)
(Continued)

(52) U.S. Cl.
CPC ........ *G05B 19/4099* (2013.01); *B23K 26/342* (2015.10); *B29C 64/393* (2017.08);
(Continued)

(58) Field of Classification Search
CPC .................................................. B23K 26/342
See application file for complete search history.

(56) References Cited

U.S. PATENT DOCUMENTS 8,110,135 B2 * 2/2012 El-Siblani .......... A61C 13/0013
264/401
9,183,325 B2   11/2015 Wighton et al.
(Continued)

FOREIGN PATENT DOCUMENTS

CN   104504186 A   4/2015
CN   105499575 A   4/2016
(Continued)

OTHER PUBLICATIONS

Kai Zeng, "Optimization of Support Structures for Selective Laser Melting", Aug. 2015, University of Louisville, Retrieved from the Internet URL:< https://ir.library.louisville.edu/cgi/viewcontent.cgi?article=3250&context=etd> (Year: 2015).*
(Continued)

*Primary Examiner* — Kenneth M Lo
*Assistant Examiner* — Jonathan Michael Skrzycki
(74) *Attorney, Agent, or Firm* — Dinsmore & Shohl LLP

(57) ABSTRACT

An industrial asset item definition data store may contain at least one electronic record defining the industrial asset item. An automated support structure creation platform may include a support structure optimization computer processor. The automated support structure optimization computer processor may be adapted to automatically create support structure geometry data associated with an additive printing process for the industrial asset item. The creation may be performed via an iterative loop between a build process simulation engine and a topology optimization engine.

16 Claims, 13 Drawing Sheets

(51) Int. Cl.
  *G05B 19/4099* (2006.01)
  *B23K 26/342* (2014.01)
  *B29C 64/393* (2017.01)
  *G06F 30/20* (2020.01)
  *B33Y 10/00* (2015.01)
  *B33Y 30/00* (2015.01)
  *G06F 119/08* (2020.01)
  *G06F 119/02* (2020.01)

(52) U.S. Cl.
  CPC .............. *B29C 64/40* (2017.08); *B33Y 50/02* (2014.12); *G06F 30/20* (2020.01); *B33Y 10/00* (2014.12); *B33Y 30/00* (2014.12); *G05B 2219/49023* (2013.01); *G05B 2219/49038* (2013.01); *G06F 2119/02* (2020.01); *G06F 2119/08* (2020.01)

(56) References Cited

U.S. PATENT DOCUMENTS

| | | | |
|---|---|---|---|
| 9,636,872 | B2 | 5/2017 | Batcheld |
| 2014/0277669 | A1 | 9/2014 | Nardi et al. |
| 2015/0190971 | A1 | 7/2015 | Musuvathy et al. |
| 2015/0269282 | A1 | 9/2015 | Nelaturi et al. |
| 2015/0331402 | A1 | 11/2015 | Lin et al. |
| 2015/0360421 | A1 | 12/2015 | Burhop et al. |
| 2016/0107234 | A1* | 4/2016 | Craeghs .................. B28B 1/001 419/53 |
| 2016/0107393 | A1* | 4/2016 | Hartmann ............. B29C 64/386 700/98 |
| 2016/0175932 | A1 | 6/2016 | Dimter et al. |
| 2016/0263838 | A1* | 9/2016 | Goldman .............. B29C 64/386 |
| 2017/0136539 | A1 | 5/2017 | Chou et al. |
| 2017/0232515 | A1 | 8/2017 | Demuth et al. |

FOREIGN PATENT DOCUMENTS

| | | |
|---|---|---|
| CN | 105904729 A | 8/2016 |
| CN | 106373184 A | 2/2017 |
| EP | 2778992 A1 | 9/2014 |
| JP | 2017111826 A | 6/2017 |
| WO | 2016195665 A1 | 12/2016 |
| WO | 2017009820 A2 | 1/2017 |

OTHER PUBLICATIONS

Strano, G. et al., "A new approach to the design and optimisation of support structures in additive manufacturing", The International Journal of Advanced Manufacturing Technology, vol. 66, Issue: 9-12, Jun. 2013, DOI 10.1007/s00170-012-4403-x, (pp. 1247-1248, 2 total pages).

Hussein, Ahmed et al., "Advanced lattice support structures for metal additive manufacturing", Journal of Materials Processing Technology, vol. 213, Issue: 7, Jul. 2013, (pp. 1019-1026, 8 total pages), http://dx.doi.org/10.1016/j.jmatprotec.2013.01.020.

Langelaar, Matthijs , "Topology optimization of 3D self-supporting structures for additive manufacturing", Additive Manufacturing, vol. 12, Oct. 2016, (pp. 60-70, 11 total pages), http://dx.doi.org/10.1016/j.addma.2016.06.010.

Strano, G. et al., "A new approach to the design and optimisation of support structures in additive manufacturing", The International Journal of Advanced Manufacturing Technology, vol. 66, Issue: 9-12, Jun. 2013, DOI 10.1007/s00170-012-4403-x, (pp. 1247-1254, 8 total pages).

International Search Report and Written Opinion dated Dec. 20, 2018 which was issued in connection with PCT Application No. PCT/US18/47346 which was filed on Aug. 21, 2018.

Das et. al.: "Optimum Part Build Orientation in Additive Manufacturing for Minimizing Part Errors and Support Structures", Procedia Manufacturing, 2015, vol. 1, pp. 343-354.

Chinese Patent Application No. 201880058868.3 Office Action dated Apr. 21, 2021.

Japanese Patent Office Action No. 2020-515007 Office Action dated May 13, 2021.

Extended European Search Report for EP Application No. 18855292.1 dated Jul. 12, 2021 (11 pages).

* cited by examiner

| DESIGN IDENTIFIER 1102 | ITEM DESCRIPTION 1104 | PROCESSING CONDITION 1106 | ORIENTATION 1108 | SUPPORT STRUCTURE GEOMETRY 1110 | STATUS 1112 |
|---|---|---|---|---|---|
| D_101 | BRACKET | C_101 | 90° | PRINT_FILE | PENDING |
| D_102 | VALVE | C_102 | 180° | IMAGE_FINAL | IN PROCESS |
| D_103 | TURBINE BLADE | C_103 | 270° | CAD_OUT | PRINTED |

OPTIMIZING SUPPORT STRUCTURES FOR ADDITIVE MANUFACTURING

BACKGROUND

Some embodiments disclosed herein relate to industrial assets and, more particularly, to systems and methods to optimize support structures associated with additive manufacturing.

In some cases, an additively printed part may require one or more support structures. For example, an industrial asset part (e.g., a lever for a wind turbine) might have a shape with an overhanging portion that needs to be support during the additive manufacturing process. As a result, a "sacrificial" support structure might be included in the geometry sent to a three-dimension printer. After the item is printed, the support structure may be removed and discarded.

Note, however, that the design of a support structure can be a complex challenge. In addition to preventing distortion, a designer will typically minimize the amount of material that is wasted. In many cases, the support structures are designed manually by an expert and the part is printed and measured to determine if the resulting distortions are within acceptable tolerance. If the results are unacceptable, the part and/or support structure is redesigned on a trial-and error basis. Such a process can be both time consuming and costly. It may therefore be desirable to achieve improved and computerized ways to efficiently and accurately facilitate a design of a support structure for an industrial asset item.

SUMMARY

According to some embodiments, an industrial asset item definition data store may contain at least one electronic record defining the industrial asset item. An automated support structure creation platform may include a support structure optimization computer processor. The automated support structure optimization computer processor may, for example, be adapted to automatically create support structure geometry data associated with an additive printing process for the industrial asset item. The creation may be performed, according to some embodiments, via an iterative loop between a build process simulation engine and a topology optimization engine.

Some embodiments comprise: means receiving, at an automated support structure creation platform from an industrial asset item definition data store, data defining the industrial asset item; and means for automatically creating, by the support structure optimization computer processor, support structure geometry data associated with an additive printing process for the industrial asset item, wherein said creating is performed via an iterative loop between a build process simulation engine and a topology optimization engine.

Technical effects of some embodiments of the invention are improved and computerized ways to efficiently and accurately facilitate a design of a support structure for an industrial asset item. With these and other advantages and features that will become hereinafter apparent, a more complete understanding of the nature of the invention can be obtained by referring to the following detailed description and to the drawings appended hereto.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
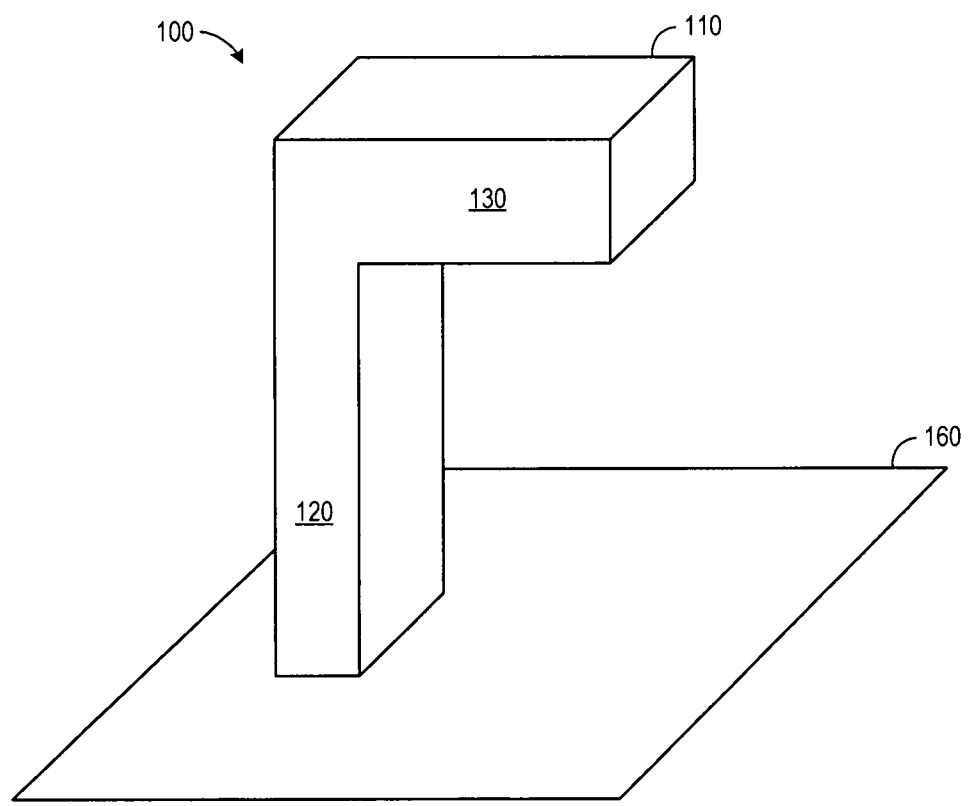
FIG. 1 is an illustration of an industrial asset item created via an additive manufacturing process.
Figure 2:
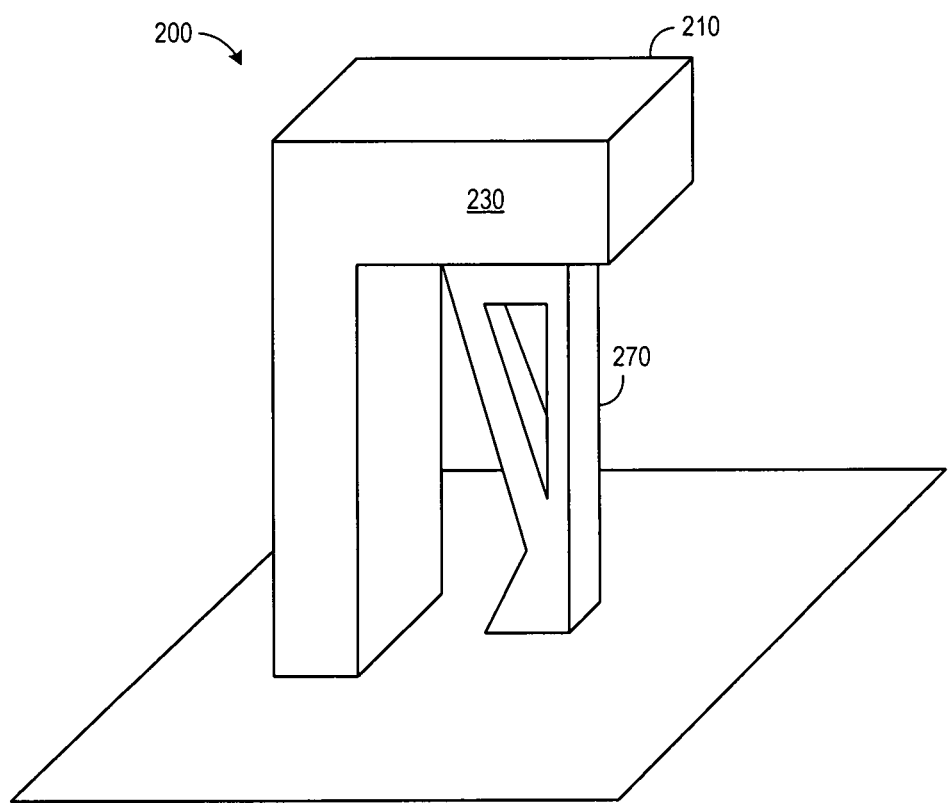
FIG. 2 is an illustration of an industrial asset item including a support structure.

In some cases, an additively printed part may require one or more support structures. FIG. 1 is an illustration 100 of an industrial asset item 110 created via an additive manufacturing process. The item 110 may be created, for example, on a printing plate 160 of a three-dimension printer. The item includes a lower portion 120 and an overhanging upper portion 130 that might be distorted when created by the printer. As a result, a sacrificial support structure might be included in the geometry sent to a three-dimension printer. FIG. 2 is an illustration 200 of an industrial asset item 210 having an overhanging portion 230. To prevent or reduce distortion, a support structure 270 has been designed to support the overhanging portion 230. After the item 210 is printed, the support structure 270 may be removed and discarded.

By way of example, parts printed using a Direct Metal Laser Melting ("DMLM") process may require a sacrificial support structure 270 to help the item 210 build successfully. The support structure 270 may provide structural stiffness for the item 210 as well as a thermal pathway for heat to be rejected from the item 210. Note that support structures may be used in regions with overhang or non-overhang surfaces that may need to be stabilized against thermal distortion. In a typical additive design process, the creation of the support structure 270 is a complex challenge that can create a design bottleneck. For example, the creation of the support structure 270 is a manually intensive process with several iterations of different support designs (and associated additive printing attempts) to come up with an acceptable combination of supports for the item 210. This can result in a relatively long design cycle time (e.g., from 6 to 24 months).

Figure 3:
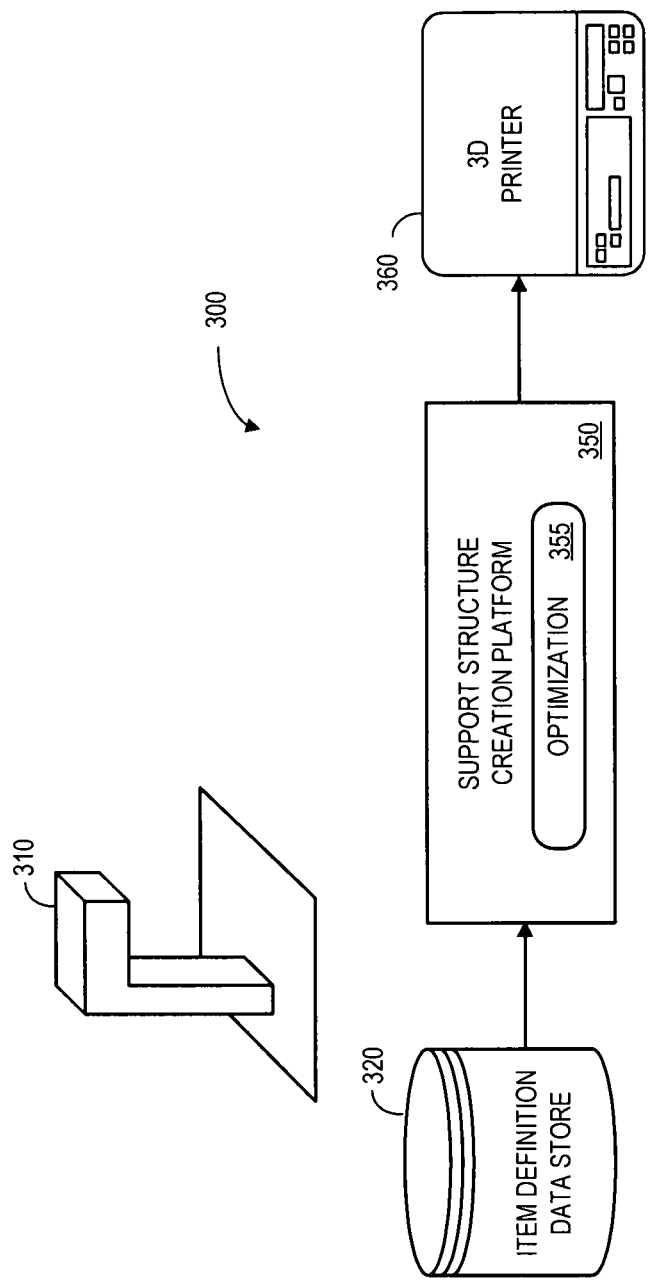
FIG. 3 is a high-level diagram of a system according to some embodiments.

It may therefore be desirable to achieve improved and computerized ways to efficiently and accurately facilitate a design of a support structure 270 for an industrial asset item 210. For example, techniques design optimized support structures may be desired to significantly reduce the time required for product realization (e.g., by reducing the number of printing iterations needed to design support structures). FIG. 3 is a high-level diagram of a generative design system 300 according to some embodiments. The system includes an automated support structure creation platform 350 that executes an optimization process 355. According to some embodiments, the automated support structure creation platform 350 can access an item definition data store 320 that includes electronic records defining an industrial asset item 310 (e.g., Computer Aided Design ("CAD") files). Note that the automated support structure creation platform 350 could be completely de-centralized and/or might be associated with a third party, such as a vendor that performs a service for an enterprise.

The automated support structure creation platform 350 and/or other elements of the system might be, for example, associated with a Personal Computer ("PC"), laptop computer, a tablet computer, a smartphone, an enterprise server, a server farm, and/or a database or similar storage devices. According to some embodiments, an "automated" support structure creation platform 350 may automatically create support structures that may be provided to a three-dimensional printer 360. As used herein, the term "automated" may refer to, for example, actions that can be performed with little (or no) intervention by a human.

As used herein, devices, including those associated with the automated support structure creation platform 350 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The automated support structure creation platform 350 may store information into and/or retrieve information from data stores, including the item definition data store 320. The data stores might, for example, store electronic records representing prior item designs, three-dimensional printer information, etc. The data stores may be locally stored or reside remote from the automated support structure creation platform 350. Although a single automated support structure creation platform 350 is shown in FIG. 3, any number of such devices may be included. Moreover, various devices described herein might be combined according to embodiments of the present invention. For example, in some embodiments, the automated support structure creation platform 350, item definition data store 320, and/or other devices might be co-located and/or may comprise a single apparatus.

Figure 4:
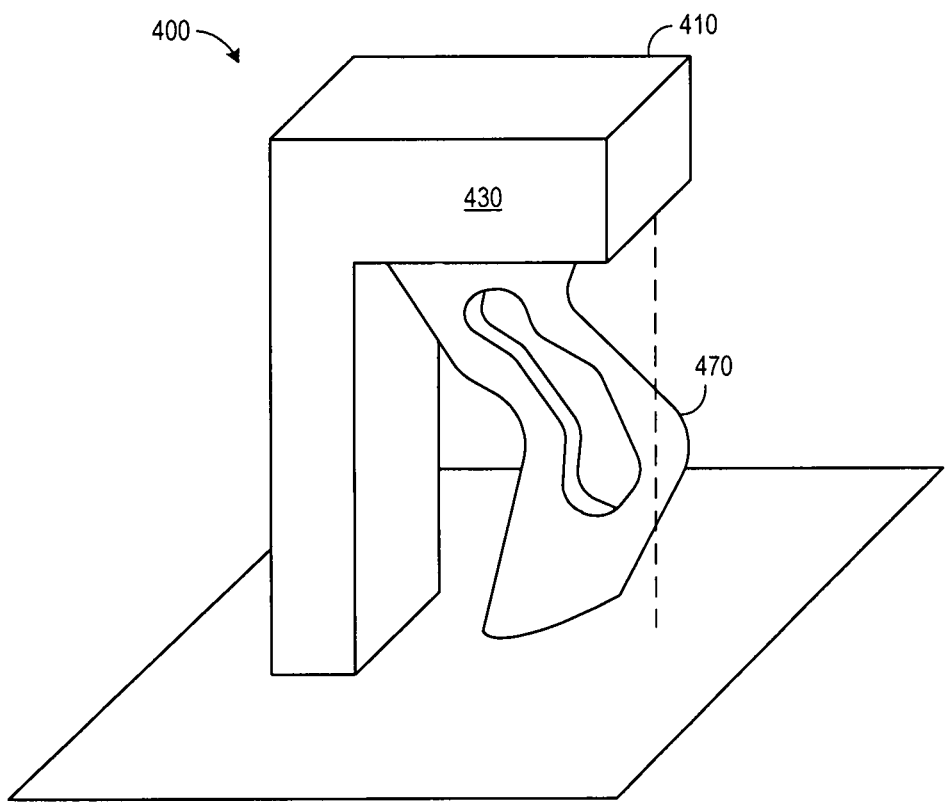
FIG. 4 is an illustration of an industrial asset item including a support structure designed in accordance with some embodiments.

In this way, the system 300 may efficiently and accurately facilitate creation of a support structure associated with creation of the item 310. For example, FIG. 4 is an illustration 400 of an industrial asset item 410 including a support structure 470 designed for an overhanging portion 430 in accordance with some embodiments. Note that the support structure 470 might, in some embodiments, extend beyond an outline defined by the overhanging portion 430 (as illustrated by a dashed line in FIG. 4). An additive manufacturing platform can then communicate the geometry of the support structure 470 to a three-dimensional printer to initiate a printing process.

Figure 5:
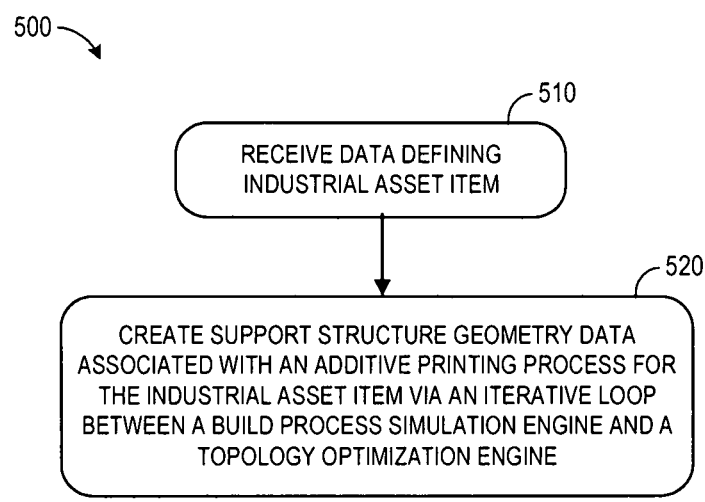
FIG. 5 is a method that may be associated with a generative design system in accordance with some embodiments.

Note that the system 300 of FIG. 3 is provided only as an example, and embodiments may be associated with additional elements or components. According to some embodiments, the elements of the system 300 automatically facilitate a design of a support structure for an industrial asset item. For example, FIG. 5 illustrates a method 500 that might be performed according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 510, the system may receive data defining the industrial asset item. For example, an automated support structure creation platform may receive data defining the industrial asset item from an industrial asset item definition data store.

At 520, the system may automatically create support structure geometry data associated with an additive printing process for the industrial asset item. Moreover, the creation may be performed via an iterative loop between a build process simulation engine and a topology optimization engine. The build process simulation engine may, for example, simulate a build process associated with the additive printing process to correlate displacement values with surface areas of the industrial asset item and establish distortion constraints and/or utilize a thermal distortion model. According to some embodiments, the build process simulation engine determines structural stiffness and thermal pathway characteristics associated with the item. The topology optimization engine may, according to some embodiments, minimize an amount of material associated with at least one support structure while satisfying the distortion constraints. The iterative loop may then execute until convergence to an acceptable final support structure geometry is achieved.

According to some embodiments, at least a portion of at least one support structure extends beyond an area defined by the industrial asset item. Note that the support structure geometry created at 520 might be stored and/or transmitted as an image, a manufactured design, a cross-section, a binary CAD file, a geometry file, and analysis result, etc.

According to some embodiments, the additive printing process associated with the support structure comprises a DMLM process. Note that embodiments might also be associated with types of three-dimensional printing, including, for example, those described in the American Society for Testing and Materials ("ASTM") group "ASTM F42—Additive Manufacturing" standards. These include vat photopolymerisation (using a vat of liquid photopolymer resin), material jetting (where material is jetted onto a build platform), binder jetting (e.g., using a powder based material and a binder), material extrusion such as Fuse Deposition Modelling ("FDM"). powder bed fusion (e.g., Direct Metal Laser Sintering ("DMLS"), Electron Beam Melting ("EBM"), etc.), a sheet lamination (including Ultrasonic Additive Manufacturing ("UAM") and Laminated Object Manufacturing ("LOM")), and Directed Energy Deposition ("DED").

Figure 6:
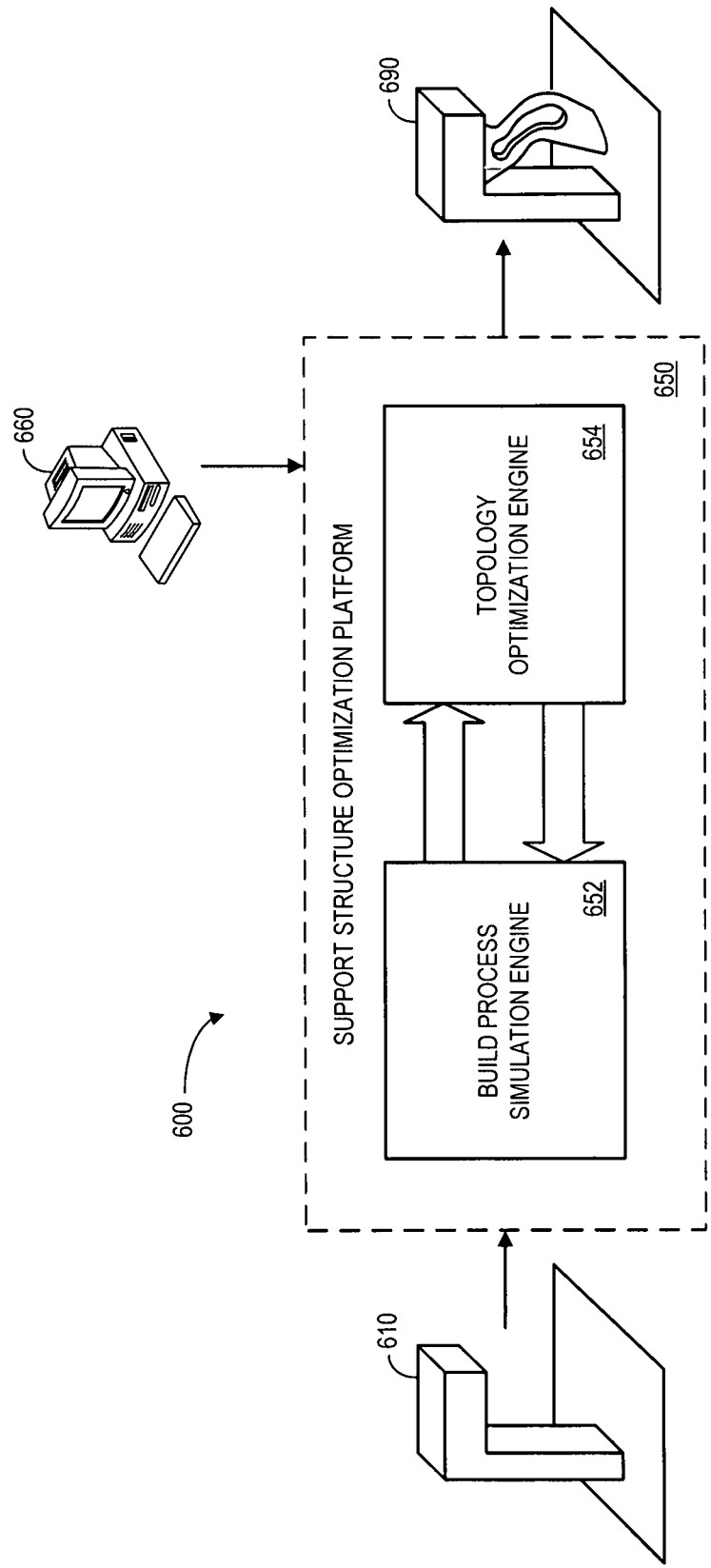
FIG. 6 is a high-level diagram of a support structure creation system according to some embodiments.

Thus, embodiments may provide a method for designing support structures which are optimized such that they use minimum volume while limiting part distortion to a specified acceptable tolerance. FIG. 6 is a high-level diagram of a support structure creation system 600 according to some embodiments. The system 600 provides the shape of an item 610 to a support structure optimization platform 650 that generates a final design 690 including an appropriate support structure. Note that embodiments may utilize an iterative loop between process simulation software 652 and a topology optimization software 654. The process simulation 642 may simulate the build process (which provides the displacement on the surface of the part). Next, the topology optimization 654 may be executed with boundary conditions established by the process simulation. The topology optimization 654 problem may have an objective to minimize the mass of the design space while still meeting the distortion constraints. The outcome of the topology optimization 650 is a support geometry. This support geometry, along with the part, may be run through the loop iteratively until it converges to an acceptable final support design 690. As described with respect to FIG. 12, in some embodiments additional rules or knowledge received from an expert device 660 may be used to create or adjust the final design 690.

Figure 7:
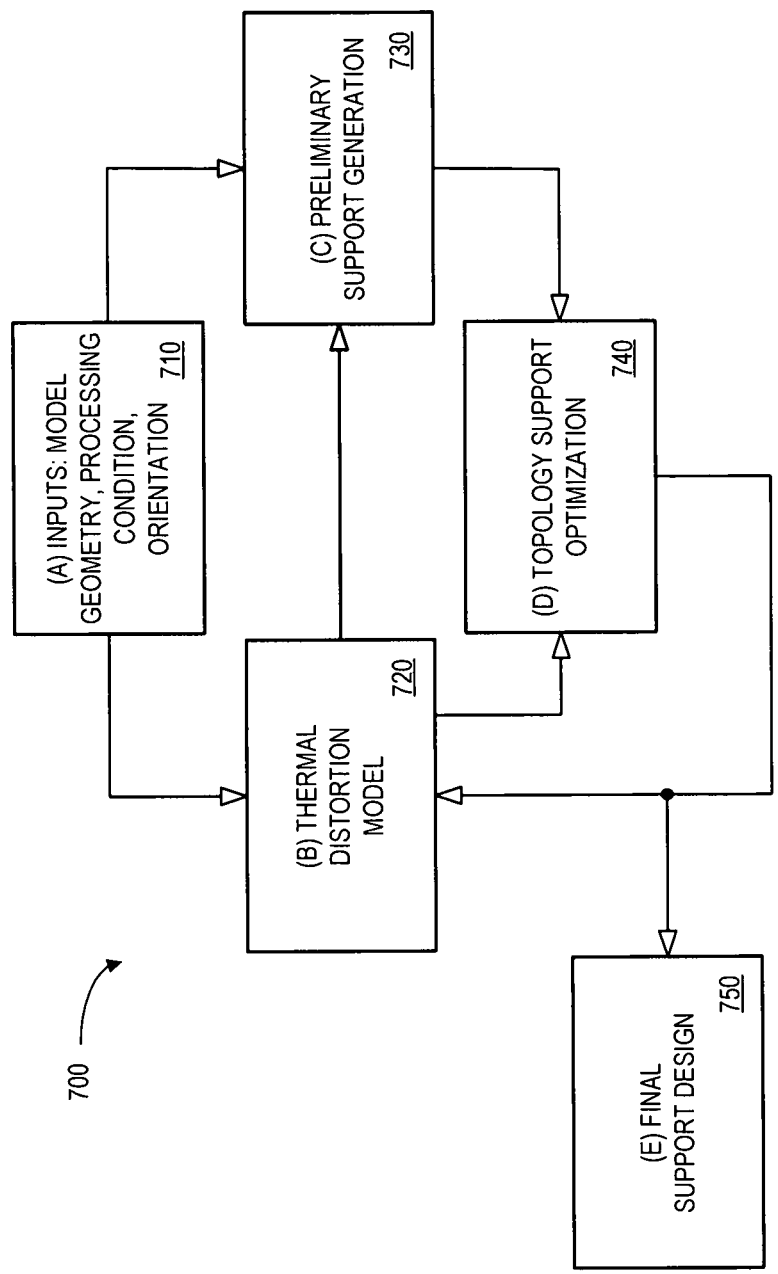
FIG. 7 is an example of an overall support structure creation methodology in accordance with some embodiments.

FIG. 7 is an example of an overall support structure creation methodology 700 in accordance with some embodiments. At (A), inputs 710, such as model geometry, processing conditions, orientation, etc. are provided to a thermal distortion model 720 and a preliminary support generation element 730. At (B), the thermal distortion model 720 may create boundary conditions for optimization that are provided to the preliminary support generation element 730 and a topology/shape optimization element 740. At (C), the preliminary support generation element 730 creates and provides a design space for optimization to the topology/shape optimization element 740. At (D), the topology/shape optimization element 740 runs iteratively until a final support structure design 750 is achieved at (E). Thus, an iterative loop is executed between two analysis: (1) the process simulation of the DMLM process as incorporated in the thermal distortion model 720, and (2) topology optimization 740 of the support design space.

According to some embodiments, a design space is created for optimization based on the part geometry. The design space might comprise an area within which the support structure may be created. Next, topology optimization may be run on the design space using boundary conditions (e.g., associated with displacements) as supplied by a thermal distortion model. The optimizer may then create a geometry with a minimum mass while still meeting the distortion and other constraints. Using the new support and the original part, the thermal distortion model may be run again to get updated distortions, which is again run by the topology optimization routine. This loop is run iteratively until a final support design is created, which can then be printed. This might occur, for example, when the loop stops improving or when a pre-determined set of constraints are satisfied.

Figure 8:
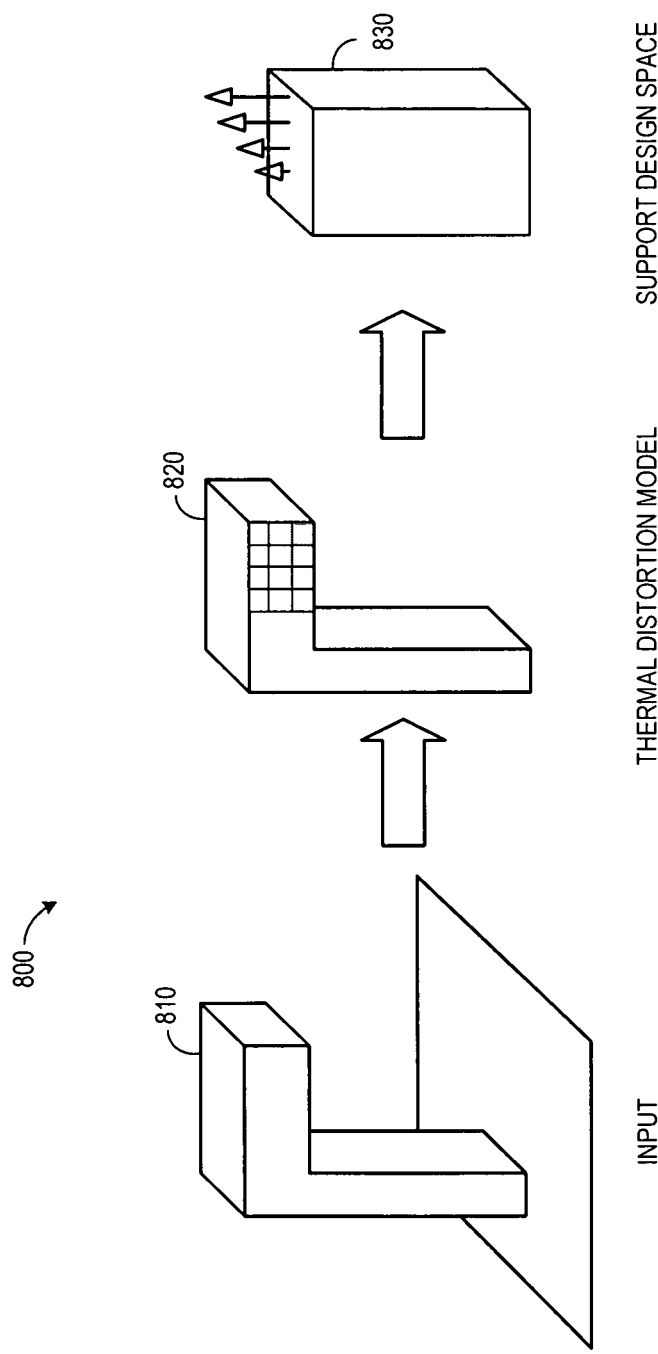
FIG. 8 illustrates a portion of a support structure design process according to some embodiments.

FIG. 8 illustrates a portion of a support structure design process 800 according to some embodiments. The process 800 begins with a definition of an industrial asset item 810. A thermal distortion model 820 may then be used to create a distortion predictions and convert boundary displacement into forces that may be supplied to a model in a design space 830. The arrows from the design space 830 in FIG. 8 illustrate forces on the support-part interface. Note that the bottom of the design space 830 illustrated in FIG. 8 may be associated with a fixed displacement (e.g., associated with a printing plate of a three-dimensional printer.

Figure 9:
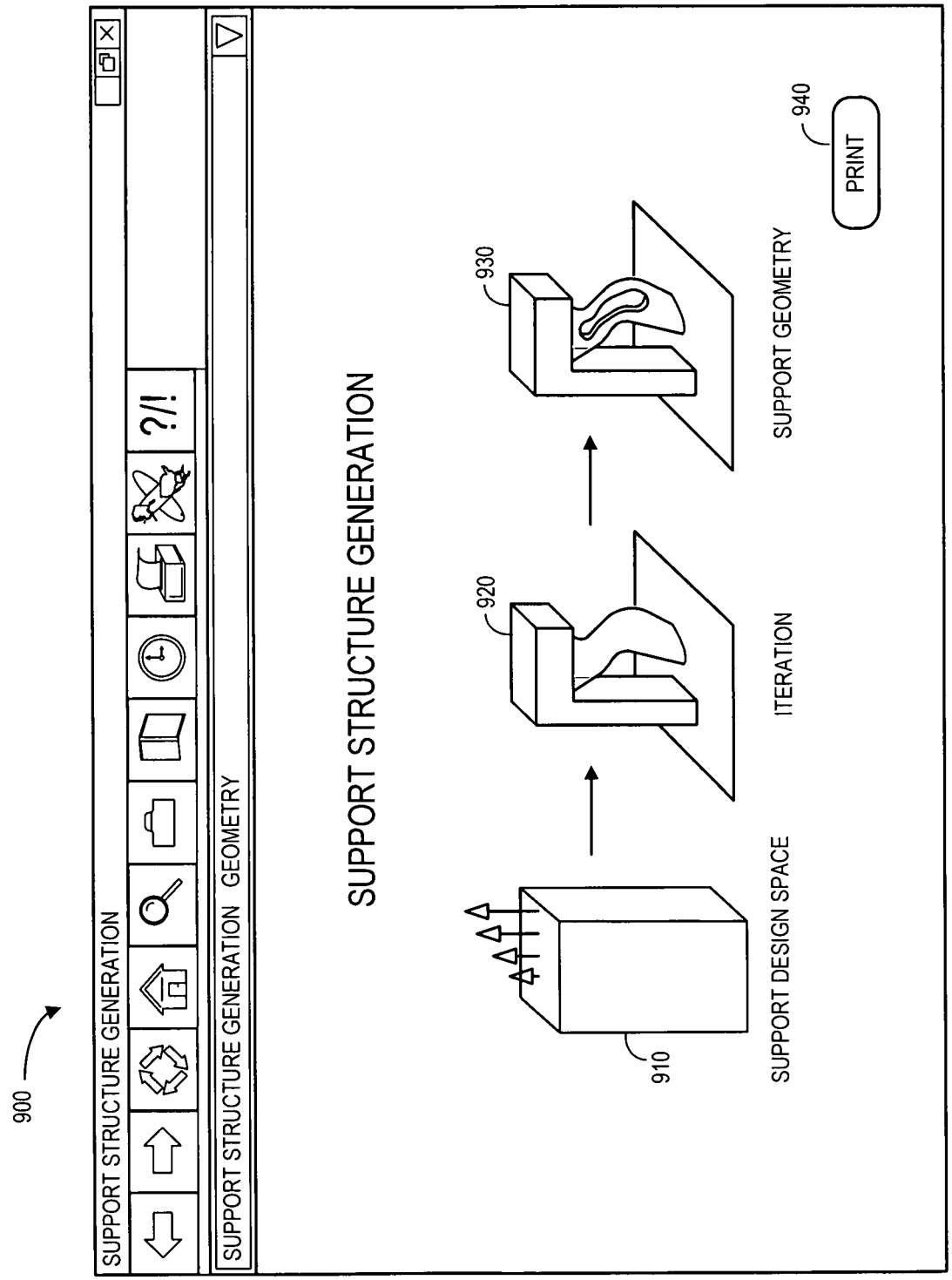
FIG. 9 illustrates a display in accordance with some embodiments.

FIG. 9 illustrates a display 900 in accordance with some embodiments. As before, arrows from a design space 910 represent forces on the support-part interface. Topology optimization may then be performed to create an iteration 920 of a support structure design. Eventually a final design 930 may be output, such as by transmitting a stereolithography or Standard Tessellation Language ("STL") file.

Figure 10:
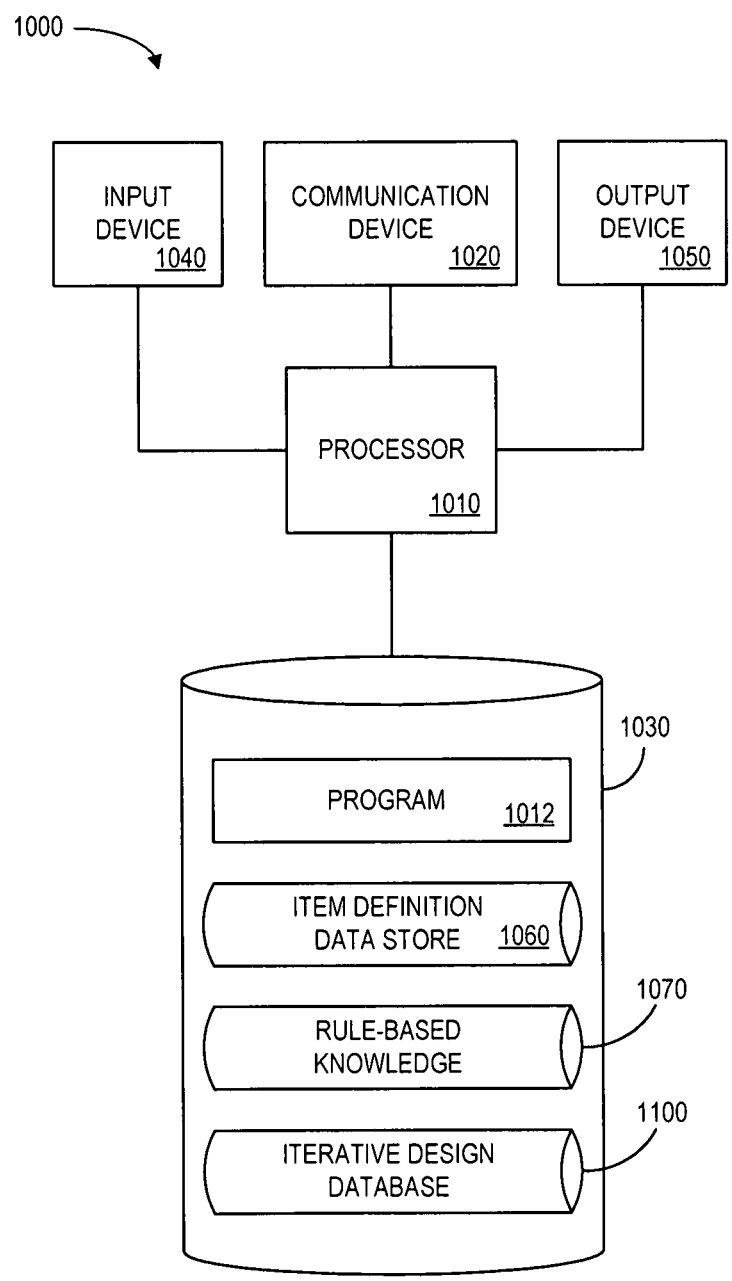
FIG. 10 illustrates a platform according to some embodiments.

Embodiments described herein may comprise a tool that facilitates design of a support structure for an industrial asset item and may be implemented using any number of different hardware configurations. For example, FIG. 10 illustrates a platform 1000 that may be, for example, associated with the system 300 of FIG. 3 (as well as other systems described herein). The platform 1000 comprises a processor 1010, such as one or more commercially available Central Processing Units ("CPUs") in the form of one-chip microprocessors, coupled to a communication device 1020 configured to communicate via a communication network (not shown in FIG. 10). The communication device 1020 may be used to communicate, for example, with one or more remote expert devices. Note that communications exchanged via the communication device 1020 may utilize security features, such as those between a public internet user and an internal network of an insurance enterprise. The security features might be associated with, for example, web servers, firewalls, and/or PCI infrastructure. The platform 1000 further includes an input device 1040 (e.g., a mouse and/or keyboard to enter information about a design file, an industrial asset item, etc.) and an output device 1050 (e.g., to output design reports, generate production status messages, etc.).

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or network security service tool or application for controlling the processor 1010. The processor 1010 performs instructions of the program 1012, and thereby operates in accordance with any of the embodiments described herein. For example, the processor 1010 may receive information defining the industrial asset item. The processor 1010 may then create support structure geometry data associated with an additive printing process for the industrial asset item. The creation may be performed, according to some embodiments, via an iterative loop between a build process simulation engine and a topology optimization engine The program 1012 may be stored in a compressed, uncompiled and/or encrypted format. The program 1012 may furthermore include other program elements, such as an operating system, a database management system, and/or device drivers used by the processor 1010 to interface with peripheral devices.

As used herein, information may be "received" by or "transmitted" to, for example: (i) the platform 1000 from another device; or (ii) a software application or module within the platform 1000 from another software application, module, or any other source.

In some embodiments (such as shown in FIG. 10), the storage device 1030 further stores an industrial asset item definition data store 1060, rule-based knowledge 1070 (as described in connection with FIG. 12), and an iterative design database 1100. An example of a database that might be used in connection with the platform 1000 will now be described in detail with respect to FIG. 11. Note that the database described herein is only an example, and additional and/or different information may be stored therein. Moreover, various databases might be split or combined in accordance with any of the embodiments described herein. For example, the item definition data store 1060 and/or iterative design database 1100 might be combined and/or linked to each other within the program 1012.

Figure 11:
FIG. 11 is a portion of an iterative design database in accordance with some embodiments.

Referring to FIG. 11, a table is shown that represents the iterative design database 1100 that may be stored at the platform 1000 in accordance with some embodiments. The table may include, for example, entries identifying designs that have been created for industrial asset items. The table may also define fields 1102, 1104, 1106, 1108, 1110, 1112 for each of the entries. The fields 1102, 1104, 1106, 1108, 1110, 1112 may, according to some embodiments, specify: a design identifier 1102, an item description 1104, a processing condition 1106, an orientation 1108, a support structure geometry 1110, and a status 1112. The iterative design database 1100 may be created and updated, for example, based on information electrically received from an administrator, additive manufacturer platforms, etc.

The design identifier 1102 may be, for example, a unique alphanumeric code identifying an industrial asset as indicated by the item description 1104. The processing condition 1106 and orientation 1108 might define how the item is to be created via an additive manufacturing process. The support structure geometry 1110 might comprise, for example, an electronic file defining a sacrificial support structure for the design identifier 1102. The status 1112 might indicate, according to some embodiments, that a design is pending, in process, printed, etc.

Figure 12:
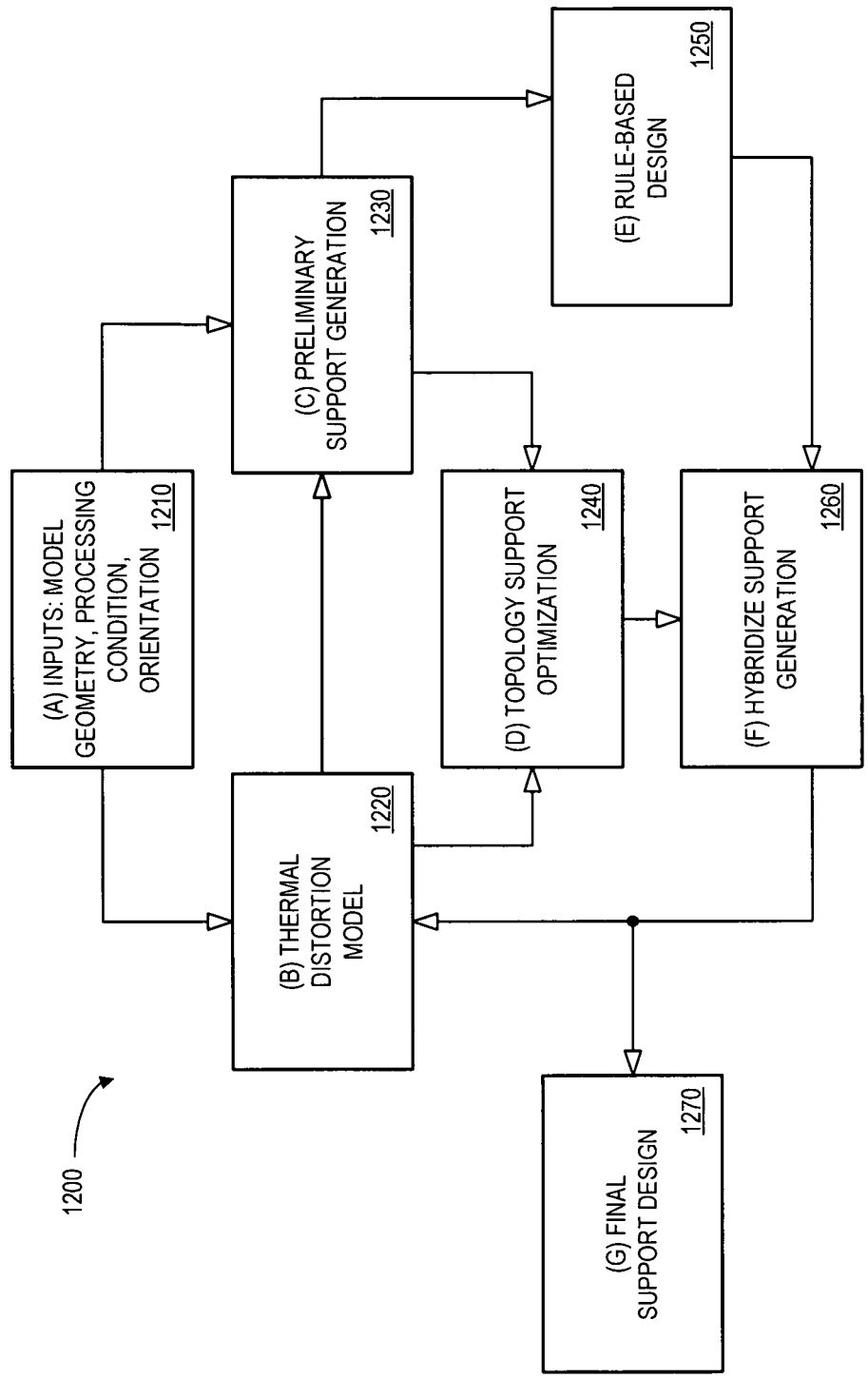
FIG. 12 is a high-level diagram of a support structure creation system according to some embodiments.

According to some embodiments, a support structure optimization computer processor further receives rule-based knowledge from an expert device and, based on the received rule-based knowledge, adjust an optimization process. For example, FIG. 12 is a high-level diagram of a support structure creation system 1200 according to some embodiments.

At (A), inputs 1210, such as model geometry, processing conditions, orientation, etc. are provided to a thermal distortion model 1220 and a preliminary support generation element 1230. At (B), the thermal distortion model 1220 may create boundary conditions for optimization that are provided to the preliminary support generation element 1230 and a topology/shape optimization element 1240. At (C), the preliminary support generation element 1230 creates and provides a design space for optimization to the topology/shape optimization element 1240. At (D), the topology/shape optimization element 1240 runs iteratively. According to this embodiment, however, at (E) rule-based support design data 1250 may be received (e.g., from an expert with know of support structure techniques). At (F), the system may iteratively hybridize support generation 1260 using the rule-based support design data 1250 as well as the information from the topology/shape optimization element 1240 until a final support structure design 1270 is achieved at (G). Thus, an iterative loop is executed between two analysis: (1) the process simulation of the DMLM process as incorporated in the thermal distortion model 1220, and (2) topology optimization 1240 of the support design space taking into account the rule-based support design data.

Thus, some embodiments described herein may provide technical advantages, such as an improved and automated ability to design support structures while minimizing part distortion and/or wasted support material. Moreover, embodiments may help improve design cycle time for additive parts and reduce manufacturing cost (e.g., since supports can be designed with minimum volume).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 13:
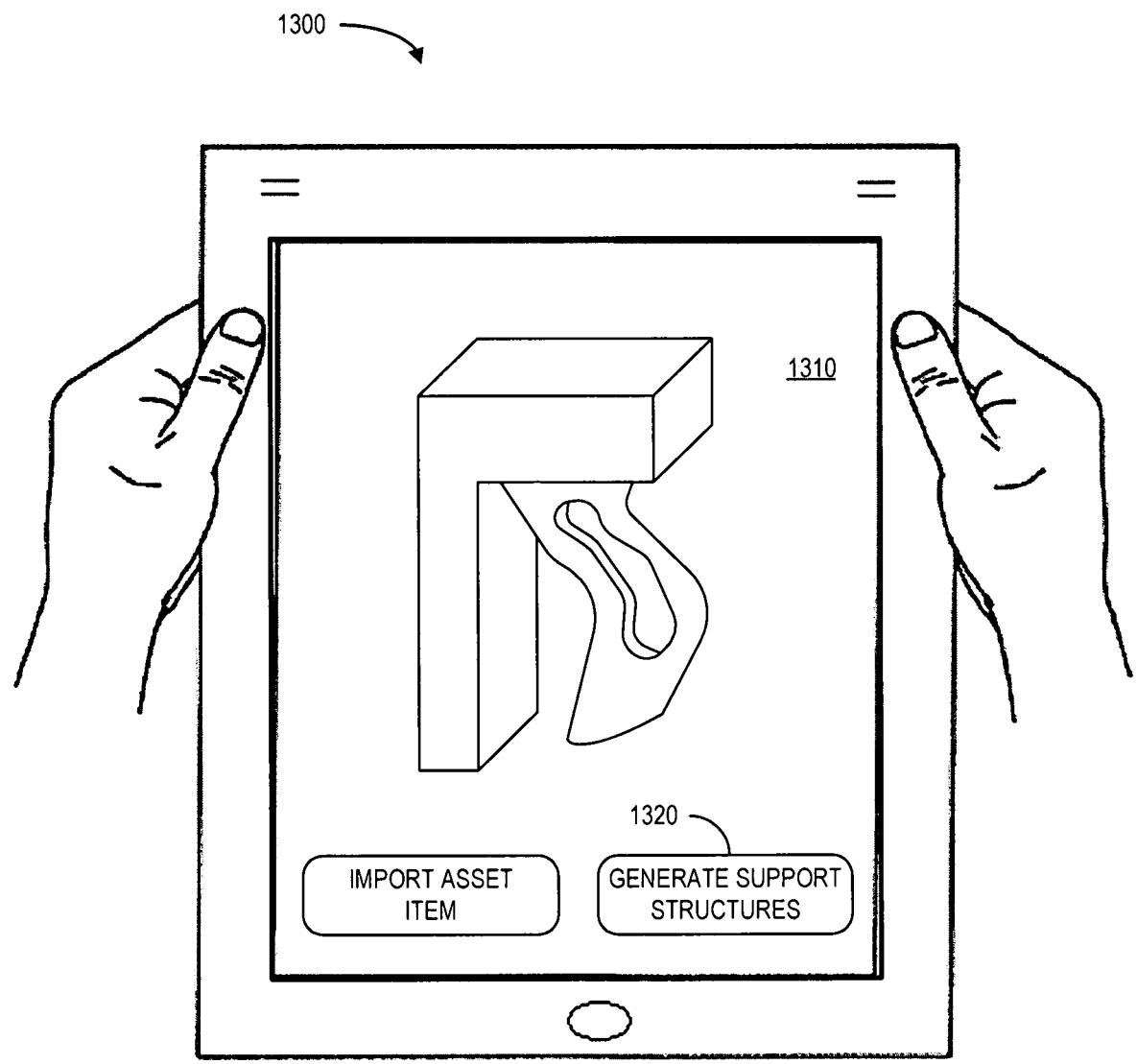
FIG. 13 illustrates a tablet computer providing a display according to some embodiments.

Although specific hardware and data configurations have been described herein, note that any number of other configurations may be provided in accordance with embodiments of the present invention (e.g., some of the information described herein may be combined or stored in external systems). Moreover, although embodiments have been described with respect to industrial systems, note that embodiments might be associated with other types of computing systems, including non-industrial systems, consumer items, etc. Similarly, the displays shown and described herein are provided only as examples, and other types of displays and display devices may support any of the embodiments. For example, FIG. 13 illustrates a tablet computer 1300 with an interactive support structure design display 1310 that might utilize a graphical user interface. The display 1310 might comprise an overview of support structure that has been automatically generated for an industrial asset item. Note that selection of an element on the display 1310 might result in a display of further information about that element. Moreover, the display 1310 might comprise an interactive user interface (e.g., via a touchscreen) and includes "import asset item" and "generate support structure" 1320 icons in accordance with any of the embodiments described herein.

Some embodiments have been described with respect to the creation of an "industrial asset item," which might be, for example, an engine part, a generator component, etc. Note, however, that as used herein the phrase "industrial asset item" might refer to any other type of item, including: consumer electronics, toys, household goods, automotive parts, etc. In general, embodiments may address the challenge in additive manufacturing where geometries are inherently complex and may be impractical to derive through traditional tools or processes. In addition to additive manufacturing, support structure design exploration may also be enhanced by the collective wisdom that is codified in rule-based design data as described herein.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system comprising:
an industrial asset item definition data store containing at least one electronic record defining an industrial asset item;
an automated support structure creation platform, communicatively coupled to the industrial asset item definition data store, including:
a communication port configured to receive the at least one electronic record defining the industrial asset item, and
a support structure optimization computer processor communicatively coupled to the communication port and configured to automatically create support structure geometry data associated with an additive printing process for the industrial asset item via a build process simulation engine and a topology optimization engine, wherein:
the build process simulation engine is configured to:
receive the at least one electronic record defining the industrial asset item;
simulate a first simulated build of the industrial asset item based on the at least one electronic record defining the industrial asset item; and
generate distortion constraints and determine first distortions for the industrial asset item according to the first simulated build of the industrial asset item,
the topology optimization engine is configured to:
receive the distortion constraints and the first distortions; and
generate a first support structure design geometry of a first support structure according to a topology determination process that minimizes a mass of the first support structure while satisfying the distortion constraints based on the first distortions,
the build process simulation engine is further configured to:
receive the first support structure design geometry;
simulate a second simulated build of the industrial asset item and the first support structure based on the at least one electronic record defining the industrial asset item and the first support structure design geometry; and
determine second distortions for the industrial asset item and the first support structure according to the second simulated build of the industrial asset item and the first support structure,
the topology optimization engine is further configured to:
receive the second distortions; and
modify the first support structure design geometry to obtain a second support structure design geometry of a second support structure according to the topology determination process that minimizes a mass of the second support structure while satisfying the distortion constraints based on the second distortions for the industrial asset item, and
an additive manufacturing printer configured to perform an additive manufacturing process to form the industrial asset item and the second support structure.

2. The system of claim 1, wherein the build process simulation engine is further configured to simulate the first simulated build of the industrial asset item to correlate displacement values with surface areas of the industrial asset item and establish the distortion constraints.

3. The system of claim 2, wherein the build process simulation engine utilizes a thermal distortion model.

4. The system of claim 3, wherein the build process simulation engine determines structural stiffness and thermal pathway characteristics.

5. The system of claim 2, wherein the topology optimization engine is further configured to generate the first support structure design geometry to reduce an amount of material associated with the first support structure while satisfying the distortion constraints.

6. The system of claim 1, wherein the additive printing process is associated with direct metal laser melting.

7. The system of claim 1, wherein at least a portion of the first support structure extends beyond an area defined by the industrial asset item.

8. The system of claim 1, wherein the support structure optimization computer processor is further configured to receive rule-based knowledge from an expert device and adjust the topology determination process based on the rule-based knowledge.

9. The system of claim 1, wherein the first support structure design geometry is associated with at least one of: (i) an image, (ii) a manufactured design, (iii) a cross-section, (iv) a binary Computer Aided Design ("CAD") file, (v) a geometry file, or (vi) analysis results.

10. The system of claim 1, wherein:
the additive manufacturing printer is configured to receive a final industrial asset design including the second support structure design geometry and is associated with at least one of: (i) three-dimensional printing, (ii) vat photopolymerization, (iii) material jetting, (iv) binder jetting, (vi) material extrusion, (vii) powder bed fusion, (viii) sheet lamination, and (ix) directed energy deposition.

11. A computer-implemented method, comprising:
receiving, at an automated support structure optimization platform from an industrial asset item definition data store, data defining an industrial asset item;
receiving, at a build process simulation engine of the automated support structure optimization platform, the data defining the industrial asset item;
simulating, by the build process simulation engine, a first simulated build of the industrial asset item based on the data defining the industrial asset item;
generating, by the build process simulation engine, distortion constraints and determine first distortions for the industrial asset item based on the first simulated build of the industrial asset item;
receiving, at a topology optimization engine of the automated support structure optimization platform, the distortion constraints and the first distortions;
generating, by the topology optimization engine, a first support structure design geometry of a first support structure according to a topology determination process that minimizes a mass of the first support structure while satisfying the distortion constraints based on the first distortions;

receiving, at the build process simulation engine, the first support structure design geometry;

simulating, by the build process simulation engine, a second simulated build of the industrial asset item and the first support structure based on the data defining the industrial asset item and the first support structure design geometry;

determining, by the build process simulation engine, second distortions for the industrial asset item and the first support structure according to the second simulated build of the industrial asset item and the first support structure;

receiving, at the topology optimization engine, the second distortions;

modifying, by the topology optimization engine, the first support structure design geometry to obtain a second support structure design geometry of a second support structure according to the topology determination process that minimizes a mass of the second support structure while satisfying the distortion constraints based on the second distortions for the industrial asset item; and additively printing, by an additive manufacturing printer performing an additive printing process, the industrial asset item and the second support structure.

12. The method of claim 11, wherein the build process simulation engine simulates a build process associated with the additive printing process to correlate displacement values with surface areas of the industrial asset item and establish the distortion constraints.

13. The method of claim 12, wherein the build process simulation engine utilizes a thermal distortion model.

14. The method of claim 13, wherein the build process simulation engine determines structural stiffness and thermal pathway characteristics.

15. The method of claim 12, wherein the topology optimization engine minimizes an amount of material associated with the first support structure while satisfying the distortion constraints.

16. The method of claim 11, wherein the additive printing process is associated with direct metal laser melting.

* * * * *